(12) United States Patent
Michiie et al.

(10) Patent No.: US 7,185,151 B2
(45) Date of Patent: Feb. 27, 2007

(54) DATA PROCESSING DEVICE CHARACTERIZED IN ITS DATA TRANSFER METHOD, PROGRAM FOR EXECUTING ON A COMPUTER TO PERFORM FUNCTIONS OF THE DEVICE, AND COMPUTER READABLE RECORDING MEDIUM STORING SUCH A PROGRAM

(75) Inventors: Norio Michiie, Tokyo (JP); Hiromitsu Shimizu, Kanagawa (JP); Yuriko Obata, Tokyo (JP); Kiyotaka Moteki, Tokyo (JP); Yasuhiro Hattori, Kanagawa (JP); Takao Okamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 295 days.

(21) Appl. No.: 10/663,783

(22) Filed: Sep. 17, 2003

(65) Prior Publication Data

US 2004/0125415 A1    Jul. 1, 2004

(30) Foreign Application Priority Data

Sep. 19, 2002  (JP)  ............................ 2002-272402
Sep. 19, 2002  (JP)  ............................ 2002-274138

(51) Int. Cl.
*G06F 12/00*  (2006.01)
(52) U.S. Cl. ..................................... 711/154
(58) Field of Classification Search ...................... None
See application file for complete search history.

(56) References Cited

U.S. PATENT DOCUMENTS 4,763,323 A * 8/1988 Nelson et al. ............... 370/449
5,294,944 A   3/1994 Takeyama et al.
5,432,537 A   7/1995 Imakawa et al.

(Continued)

FOREIGN PATENT DOCUMENTS

JP         6-103225       4/1994

(Continued)

OTHER PUBLICATIONS

U.S. Appl. No. 10/663,783, filed Sep. 17, 2003, Michiie et al.

(Continued)

*Primary Examiner*—Mano Padmanabhan
*Assistant Examiner*—Duc T Doan
(74) *Attorney, Agent, or Firm*—Oblon, Spivak, McClelland, Maier & Neustadt, P.C.

(57) ABSTRACT

A data processing device is disclosed. The device is provided with a plurality of data processing units; a first memory shared for storing data, to which each of the data processing units makes an access so as to perform an operation; a transfer completion time designation unit for designating a transfer completion time according to need, within which transferring the data in response to the accesses made by the data processing units should be completed; an expected transfer completion time calculation unit for calculating an expected transfer completion time needed for completing the data transfer in response to the accesses made by the data processing units, taking current access status of the first memory into consideration; and an access management unit for managing the access to the first memory based on the transfer completion time and the expected transfer completion time.

23 Claims, 14 Drawing Sheets

U.S. PATENT DOCUMENTS

| | | |
|---|---|---|
| 5,610,651 A | 3/1997 | Yamakawa et al. |
| 5,623,639 A * | 4/1997 | Yazaki et al. ............... 711/167 |
| 5,987,227 A | 11/1999 | Endo et al. |
| 6,226,102 B1 | 5/2001 | Koike et al. |
| 6,253,246 B1 * | 6/2001 | Nakatsuyama ............. 709/233 |
| 6,449,064 B1 | 9/2002 | Hattori et al. |
| 6,643,473 B2 | 11/2003 | Moteki |

FOREIGN PATENT DOCUMENTS

| | | |
|---|---|---|
| JP | 2000-158724 | 6/2000 |

OTHER PUBLICATIONS

U.S. Appl. No. 11/221,703, filed Sep. 9, 2005, Obata et al.
U.S. Appl. No. 11/151,409, filed Jun. 14, 2005, Obata et al.
U.S. Appl. No. 10/997,870, filed Nov. 29, 2004, Michiie et al.
U.S. Appl. No. 10/928,481, filed Aug. 30, 2004, Hattori et al.
English Translation of Summary of Office Action with respect to Japanese Patent No. 2002-272402.

* cited by examiner

FIG.7

OUTPUT WAIT QUEUE2

| NO. | ID | ORIGIN | STATUS | TRANSFER AMOUNT | COMPLETION TIME |
|---|---|---|---|---|---|
| 1 | 09 | FAX INPUT | IN TRANSFER | 512 LINES | 13:00:00 |
| 2 | 0C | SCANNER | | | |
| 3 | 0D | | | | |
| . | . | | | | |

INPUT WAIT QUEUE1

| NO. | ID | ORIGIN | STATUS | TRANSFER AMOUNT | COMPLETION TIME |
|---|---|---|---|---|---|
| 1 | 0A | SCANNER INPUT | IN TRANSFER | 512 LINES | 13:00:00 |
| 2 | 0B | DATA DELIVERY INPUT | WAITING | 1024 LINES | 13:00:50 |
| 3 | 10 | SCANNER INPUT | WAITING | 1024 LINES | 13:01:00 |
| . | . | ... | ... | ... | ... |

DATA PROCESSING DEVICE CHARACTERIZED IN ITS DATA TRANSFER METHOD, PROGRAM FOR EXECUTING ON A COMPUTER TO PERFORM FUNCTIONS OF THE DEVICE, AND COMPUTER READABLE RECORDING MEDIUM STORING SUCH A PROGRAM

BACKGROUND OF THE INVENTION

1. Field of the Invention

The present invention generally relates to a data processing device provided with a plurality of data processing units, wherein each data processing unit makes an access to a memory shared for data storage so as to perform an operation.

The present invention further relates to an image-forming device, which image-forming device can efficiently perform input/output operations of image signals of a digital copying machine, a facsimile, a printer, etc.

2. Description of the Related Art

Recently and continuing, the digitization of copying machines, etc., is in progress. Based on this progress, many image processing functions other than processing and editing images are becoming incorporated in the copying machines.

An example of such image processing functions is an electronic sorting function, which can dispense with the manual sorting operation by storing image data of a plurality of manuscripts in a memory and by providing a designated number of copies of manuscripts all at once. However, when the image data of the manuscripts is to be stored in the memory, the cost of the memory becomes high since the amount of image data is enormous. Accordingly, in order to reduce the memory cost, the following configurations are generally used.

1. First configuration—A semiconductor memory and a storage memory. A secondary storage device such as a hard disk device, which is less expensive than the semiconductor memory, is used as the storage memory (secondary memory).
2. Second configuration—A semiconductor memory is used as the storage memory. By reducing the data amount per image through image data compression operations, the necessary memory capacity is reduced.
3. Third configuration—A single memory is shared by a plurality of image input/output means (for example, an image scanner, a printer controller, a file server, and a facsimile controller).

For executing image input/output operations with respect to the memory, a memory controller (DMA controller) that uses a Direct Memory Access (DMA) data transfer method is often used. (See, for example, Japanese Laid-Open Patent Application No. 6-103225 and NO. 2000-158724.) The DMA controller performs access/data transfer with respect to a particular region of the memory based on memory region management information referred to as a descriptor, which management information indicates the procedure for the data transfer. It is also possible to perform the data transfer by dividing the memory region into which a single image is stored by a plurality of descriptors. For example, the memory may be used in the form of a ring buffer so as to execute input/output of the image data using less memory capacity as compared to the image data amount.

The memory access control using the DMA controller enables the system to keep track of current status of the data transfer (start and finish) designated by each descriptor and to control the execution timing of the data transfer (interruption or resumption of data transfer when accessing the image memory regions and interruption completion report of each descriptor, etc.). Accordingly, there are advantages such as high flexibility of timing control of access/data transfer with respect to the memories such as a semiconductor memory and a large-capacity secondary memory device, which are connected to the DMA controller, and a broad scope of application.

In the above-mentioned first configuration, generally, a plurality of data transfer operations (data writing operation and data reading operation) cannot be performed simultaneously with respect to a single memory device. Therefore, it is common to divide the data transfer (access) unit with respect to the secondary memory device by descriptors of the DMA controller. This is done in a time-multiplexed way so that it looks as if the plurality of data transfer operations are performed in parallel.

However, when such a time-multiplexed process is used, the overall amount of time needed for the data transfer is not reduced. Accordingly, in devices such as an image-forming device, in which the reduction in the amount of time needed for the input/output of image data has influence on the device productivity, the use of a time-multiplexed process may reduce the device productivity. Accordingly, in such an image-forming device, the above-mentioned second configuration may be employed, or a secondary memory device with a rapid data transfer rate may be implemented so as to reduce the time needed for the data transfer to the secondary memory device.

Further, in the image-forming device according to the related art, for the reason of simplifying the memory control, the time-multiplexed transfer is not preferably performed. Instead, in general, the secondary memory device is used as a resource and performs the data transfer approximately in phase with the image data input/output operation by the image input/output means.

In general, when compared with a first data transfer rate between the image input/output means and the semiconductor memory, a second data transfer rate between the semiconductor memory and the secondary memory device is low. The difference between the first data transfer rate and the second data transfer rate does not change even when the amount of data to be transferred to the secondary memory device is reduced by image compression. Therefore, the productivity of the image-forming device does not improve significantly even when the transferring timing of the data transfer process (including data conversion processes such as data compression, etc.) between the semiconductor memory and the secondary memory device is independently and appropriately controlled.

The transfer rate of the secondary memory device such as a hard disk device is improving year by year, and such improvement has also enabled an increasing productivity of the image-forming devices. However, a recent high-speed machine requires an even higher data transfer rate since such a machine reads both sides of the manuscript simultaneously; the processing ability (processing speed) of the image input/output means is improved; and further there are some machines with a mechanical constraint in that predetermined productivity cannot be realized unless the manuscript feeding process is performed in the non-interval mode. Accordingly, these days, the current data transfer (access) status with respect to the secondary memory device and the characteristics thereof, etc. are taken into consideration for switching between interval control and non-interval control of manuscript feeding.

Accordingly, with the recent improvements in devices such as an image-forming device as mentioned above, the data transfer rate with respect to the secondary memory device with large capacity such as a hard disk device, etc., is not always sufficient when compared with the data transfer rate with respect to the image input/output means even when the amount of data is reduced by data compression.

As an example, when image output means is to provide a color image from image data with multiple colors, the color image cannot be properly provided unless the image data stored in the secondary memory device is provided within a predetermined period of time, or the productivity of the device is significantly reduced since the time needed for providing the color image is long. Therefore, it is necessary for the image-forming device to cope with such a problem.

As another example, when a device such as an image-forming device is provided with a facsimile function, the facsimile transmission may be placed under restraint related to the data transfer time period in the protocol for data transfer using telephone lines. Accordingly, unless the data transmission is performed within a certain period of time, the connection is cut and thus the data cannot be transmitted. This facsimile transmission function is a typical function in such a device. Therefore, it is necessary for the image-forming device to cope with such a problem.

Further, when a device such as an image-forming device can perform a plurality of image signal input/outputs in parallel simultaneously, the efficiency of the image signal processing (input: storage, output: reading out) with respect to the secondary memory device becomes a key factor for improving the productivity of the image-forming device. However, under the current circumstances where there is a wide variety of image input/output means, it is becoming more challenging for the image-forming device to assure high productivity by maximally utilizing the memory device and capability of the data compression means.

SUMMARY OF THE INVENTION

Accordingly, it is a general object of the present invention to provide a data processing device that comprises a plurality of data processing units, wherein, the data processing unit makes an access to a memory shared for data storage including a secondary memory device so as to meet a constraint of data transfer time when at least one of the data processing units having such a constraint.

It is another object of the present invention to provide an image-forming device with high productivity, which image-forming device is capable of efficiently controlling the data transfers in accordance with the processing capability of the memory device by using the Direct Memory Access (DMA) data transfer method.

It is another object of the present invention to provide an image-forming device, which image-forming device is capable of performing optimal image input/output operations in accordance with the image signal transfer rate between image input/output means and the memory device, which rate is determined from the processing time constraint and configuration of the image input/output means and their peripheral control devices.

As a first aspect of the present invention, there is provided a data processing device comprising a plurality of data processing units; a first memory shared for storing data, to which first memory each of the data processing units makes an access so as to perform an operation; a transfer completion time designation unit for designating a transfer completion time according to need, within which transfer completion time, transferring the data in response to the accesses made by the data processing units should be completed; an expected transfer completion time calculation unit for calculating an expected transfer completion time needed for completing the data transfer in response to the accesses made by the data processing units, the expected transfer completion time calculation unit calculating the expected transfer completion time by taking current access status of the first memory into consideration; and an access management unit for managing the access to the first memory based on the transfer completion time and the expected transfer completion time.

Accordingly, since the data processing device according to the present invention executes the data transfers in response to the accesses by taking the current access status of the memory into consideration, it is possible to execute the data transfer so as to meet a constraint related to the time needed for the data transfer, if any.

In the data processing device according to the present invention, the device may further comprise a second memory for storing the data stored in the first memory, which second memory having a transfer rate lower than the transfer rate of the first memory, and when the data transfer is executed between the first memory and the second memory, the expected transfer completion time calculation unit may calculate the expected transfer completion time by taking the data transfer rates of the first memory and the second memory into consideration.

Accordingly, since the data processing device according to the present invention executes the data transfers in response to the accesses by taking the data transfer rates of the first memory and the second memory into consideration, it is possible to execute the data transfer so as to meet a constraint related to the time needed for the data transfer, if any.

In the data processing device according to the present invention, when one of the data processing units makes an additional access to the first memory, the access management unit may prevent or postpone the additional access to the first memory when the expected transfer completion time exceeds the transfer completion time.

Accordingly, since the additional access and its accompanying data transfer is prevented or postponed when the expected transfer completion time exceeds the transfer completion time, it is possible to provide a data processing device that executes the data transfers so as to meet a constraint related to the time needed for the data transfer, if any.

The data processing device according to the present invention may be an image-forming device provided with one data processing unit as an image input unit for inputting image data to the first memory and one data processing unit as an image output unit for outputting the image data stored in the first memory.

Therefore, in the data processing device according to the present invention, the accessing by the data processing units of the memory is managed based on the transfer completion time designated by the transfer completion time designation unit, within which transfer completion time, transferring the data in response to the accesses made by the data processing units should be completed; and the expected transfer completion time calculated by the expected transfer completion time calculation unit, which expected transfer completion time is needed for completing the data transfer in response to the accesses made by the data processing units, the expected transfer completion time calculation unit calculating the expected transfer completion time by taking current access status of the first memory into consideration. Thus, with the data processing device according to the present invention, even when there is constraint related to the time needed for transferring the data, it is always possible to make an access to the memory and perform data transfer in response to such an access so as to meet such constraint.

As a result, each of the data processing units provided to the data processing device according to the present invention can always optimally perform its process without substantially decreasing the processing rate and therefore, high productivity of the data processing device can be maintained.

To put it differently, when accesses are made to the memory by the data processing units so as to perform operations, the expected transfer completion time is calculated based on the data transfer processes corresponding to the accesses made. When the expected transfer completion time exceeds the allowable transfer completion time, some of data transfer processes (usually data transfer processes that are requested at a later time than others) are prevented or postponed. Since some of the data transfer processes are prevented or postponed so as not decrease the processing rates of respective data processing units, it is always possible to execute only the data transfer processes that can be actually completed within the allowable transfer completion time. The productivity of the data processing device according to the present invention can be improved since some of the data transfer processes are prevented or postponed before the actual operations of the data processing units, which requested such data transfer processes, are started, and accordingly since execution of wasteful data transfer processes, which are to be disenabled due to their impossibility of completing the data transfer processes within the allowable transfer completion time, is prevented.

In addition, according to the present invention, there is provided a program for executing on a computer to perform the functions of a plurality of data processing units; a first memory shared for storing data, to which first memory each of the data processing units makes an access so as to perform an operation; a transfer completion time designation unit for designating a transfer completion time according to need, within which transfer completion time, transferring the data in response to the accesses made by the data processing units should be completed; an expected transfer completion time calculation unit for calculating an expected transfer completion time needed for completing the data transfer in response to the accesses made by the data processing units, the expected transfer completion time calculation unit calculating the expected transfer completion time by taking current access status of the first memory into consideration; and an access management unit for managing the access to the first memory based on the transfer completion time and the expected transfer completion time.

Further, according to the present invention, there is provided a computer-readable recording medium storing a program for executing on a computer to perform the functions of a plurality of data processing units; a first memory shared for storing data, to which first memory each of the data processing units makes an access so as to perform an operation; a transfer completion time designation unit for designating a transfer completion time according to need, within which transfer completion time, transferring the data in response to the accesses made by the data processing units should be completed; an expected transfer completion time calculation unit for calculating an expected transfer completion time needed for completing the data transfer in response to the accesses made by the data processing units, the expected transfer completion time calculation unit calculating the expected transfer completion time by taking current access status of the first memory into consideration; and an access management unit for managing the access to the first memory based on the transfer completion time and the expected transfer completion time.

As a second aspect of the present invention, there is provided an image-forming device comprising an image input unit; an image output unit; a storage unit for storing an image signal provided from the image input unit in a primary storage part, and for storing the image signal stored on the primary storage part in a secondary storage part; a delivering unit for delivering the image signal stored in the primary storage part, which image signal is read out from the secondary storage part, to the image output unit; and a priority designation unit for designating priority for each of a plurality of image signal input/output operation requests.

Since priority for each of the image signal input/output operation-requests can be designated, it is possible to efficiently execute a series of image signal input/output operations based on the priority. Therefore, the image signal input/output operations can be efficiently controlled according to the processing capability of the memory device. Accordingly, an image-forming device, which is capable of efficiently controlling the data transfers in accordance with the processing capability of the memory device, can be provided.

The image-forming device according to the present invention may further comprise a request acceptance unit for accepting the image signal input/output operation requests; a processing order control unit for determining a processing order of the image signal input/output operation requests based on respective priorities designated by the priority designation unit; and an interruption/resumption control unit for interrupting a current image signal input/output operation request when the priority of the current image signal input/output operation request is lower than the highest priority of an image signal input/output operation request among the image signal input/output operation requests, and for resuming the current image signal input/output operation request after completion of the image signal input/output operation request with the highest priority.

In the image-forming device according to the present invention, the image signal input/output operation request with the highest priority is extracted from the image signal input/output operation requests, each of which is provided with a priority. When the priority of the image signal input/output operation request with the highest priority among the image signal input/output operation requests is higher than the priority of the current image signal input/output operation request, and when such a current image signal input/output operation request is interruptible, the operation of the current image signal input/output operation request is interrupted; the operation of the image signal input/output operation request with the higher priority is executed; and the operation of the interrupted image signal input/output operation request is resumed when the operation of the image signal input/output operation request with higher priority is completed. Accordingly, the processing time needed for the operation of the image signal input/output operation request with higher priority can be reduced. Therefore, an image-forming device, which is capable of efficiently controlling the data transfers in accordance with the processing capability of the memory device, can be provided.

It is noted that there may be also provided a designation unit for designating interruptibility or non-interruptibility of the operation of the current image signal input/output operation request.

The image-forming device according to the present invention may further comprise a selection unit for selectively executing the control of the processing order control unit and the interruption/resumption control unit.

Accordingly, it is possible to employ the processing order control based on priority according to need. Therefore, an image-forming device, which is capable of performing optimal image input/output operations, can be provided.

BRIEF DESCRIPTION OF THE DRAWINGS

FIG. 7 shows two tables illustrating waiting queues managed by a system control unit;

DETAILED DESCRIPTION OF THE PREFERRED EMBODIMENTS

In the following, principles and embodiments of the present invention are described with reference to the accompanying drawings.

A first embodiment according to the present invention is described below.

Figure 1:
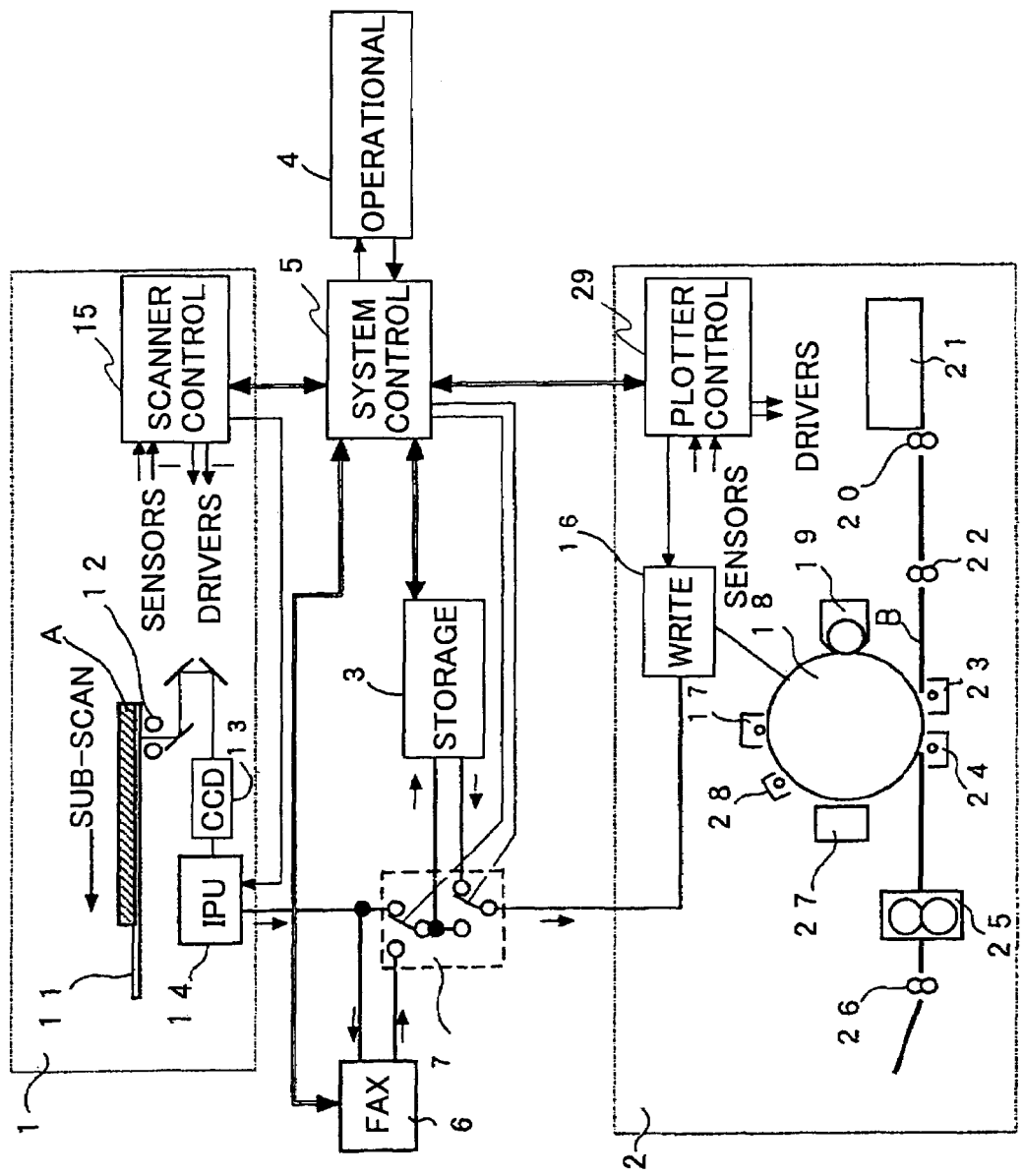
FIG. 1 is a schematic diagram of a data processing device (an image-forming device) according to the invention.

FIG. 1 is a schematic diagram of a data processing device according to the present invention. Here, a digital copying machine is shown as an example of the data processing device; however, the present invention is not limited thereto.

As shown in FIG. 1, the digital copying machine according to the present invention is provided with a reading unit 1 for reading an image of a manuscript, an image-forming unit 2 for forming (printing) the image on a transfer medium, a storage unit 3 for storing the image data, an operational unit 4 arranged with various keys and a display, and a system control unit 5 for controlling each part of the device based on operational information from the operational unit 4. Further, a facsimile unit 6 for receiving and transmitting data through telephone lines is switchably connected via a selector unit 7 for switching destinations of the image data.

Figure 2:
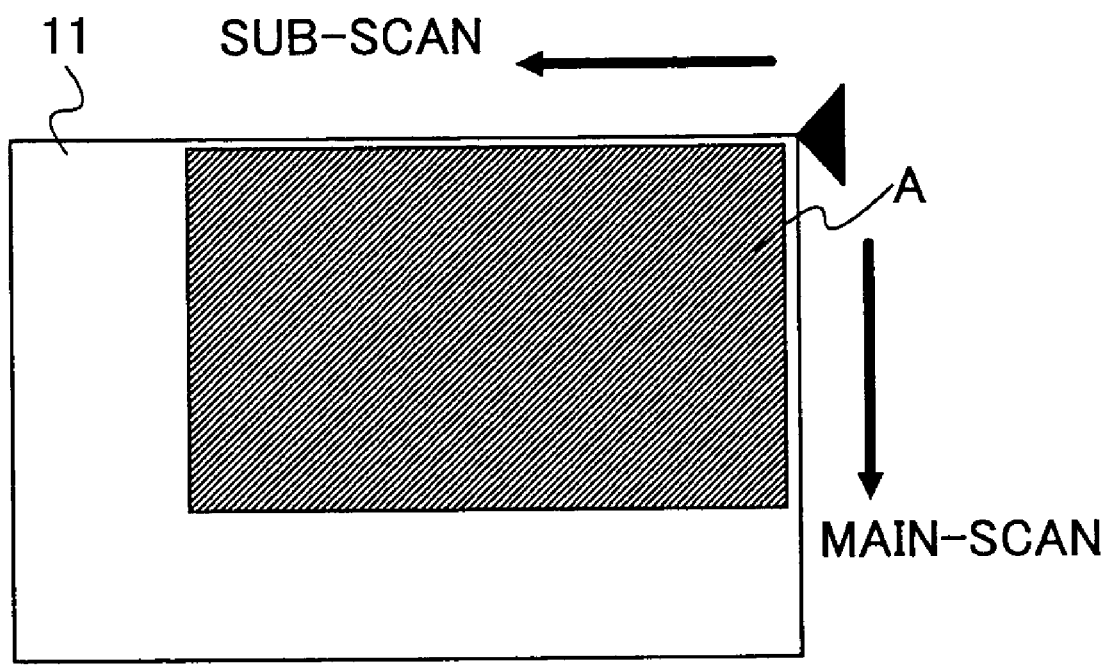
FIG. 2 is a diagram for illustrating the scanning of an image of a manuscript provided on a manuscript table.

The reading unit 1 performs scan exposure on a manuscript A by displacing an exposure lamp 12 along the manuscript table 11 in the sub-scanning direction as shown in FIG. 2. The reflected light is directed to a CCD image sensor 13 by a plurality of reflectors. The image sensor 13 performs photoelectric conversion and generates electric signals according to the strength of the reflected light. An image-processing unit (IPU) 14 generates digital image data of 8 bits with respect to the electric signals by performing analog-to-digital conversion after shading correction, etc.

The IPU 14 further performs image processes such as magnification change, dithering, etc. If the image data after the image processes is to be output immediately, the image data is provided to the image-forming unit 2 with an image synchronization signal.

A scanner control part 15 processes detected data from various sensors and controls a drive motor for displacing the exposure lamp 12, etc., and further performs setting of various parameters for the IPU 14 in order to realize the above-mentioned processes. Accordingly, the scanner control part 15 performs the overall control of the reading unit 1.

Figure 3:
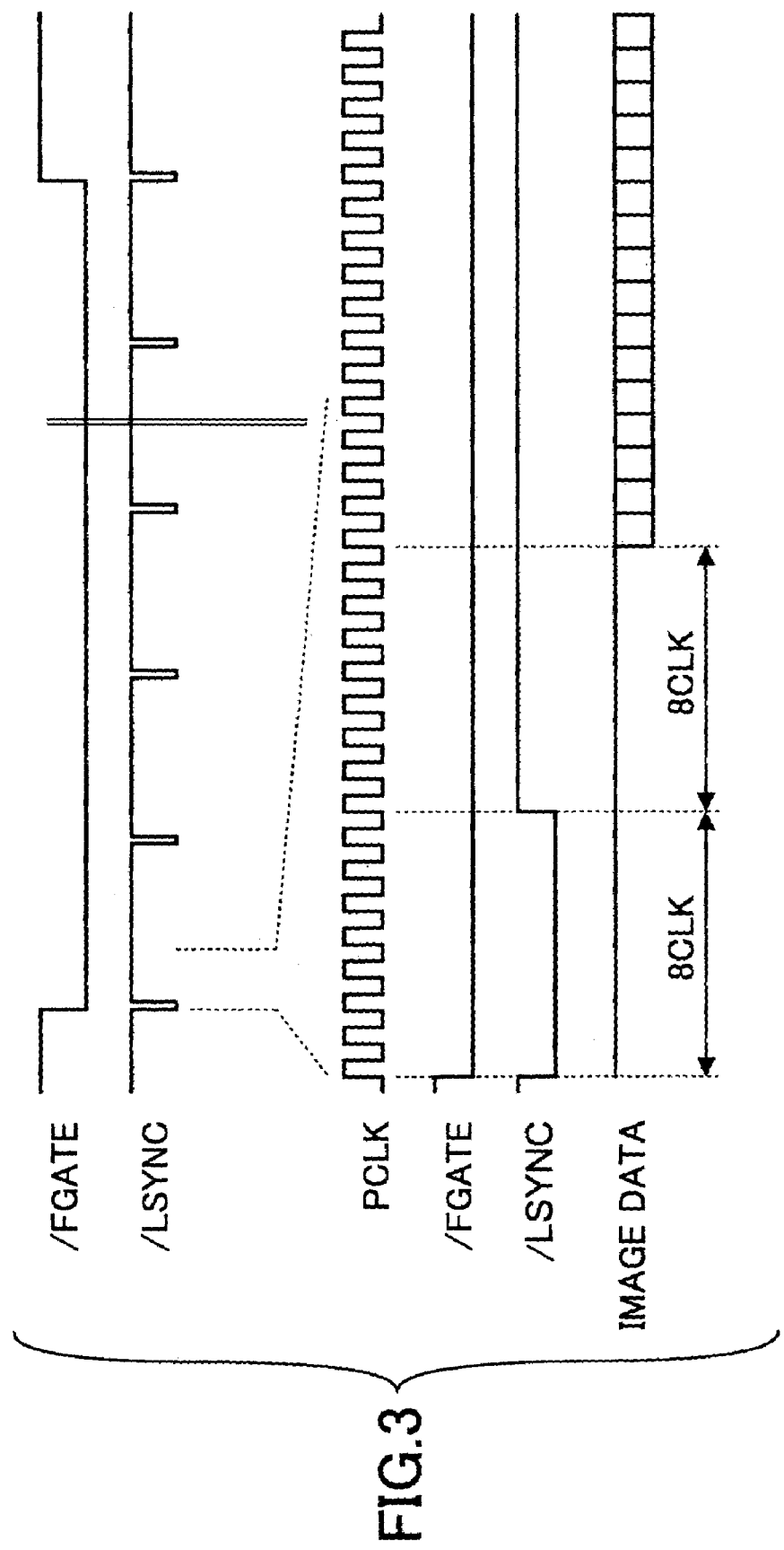
FIG. 3 is a timing chart for illustrating the outputting of image data by an image processor unit (IPU) in a reading unit.

Now referring to FIG. 3, an image data output of the IPU 14 of the reading unit 1 is described below.

A frame gate signal /FGATE is a signal indicating an image effective range of the image area in the sub-scanning direction. When the signal /FGATE is low level (low active), the image data is available. The signal /FGATE is either asserted or negated by a falling edge of a line synchronization signal /LSYNC. The signal /LSYNC is asserted by a rising edge of a pixel synchronization signal PCLK for a predetermined number of clocks. The image data in the main-scanning direction is available after the rising edge of the signal PCLK and after the predetermined number of clocks. One image data set is provided with respect to one cycle of the signals PCLK and corresponds to the division in the main-scanning direction into approximately 157.5 DPC (=4,000 DPI). The image data set is delivered in the raster format, in which format, the image data in the main-scanning direction is provided as the position in the sub-scanning direction is changed. The effective range in the sub-scanning direction is generally defined by the size of the transfer medium.

Referring to FIG. 1 again, in the image-forming unit 2, the image data is provided to a writing part 16 and a photoconductor 18 rotating at constant velocity and uniformly charged by an electric charger 17 is exposed to laser light modulated according to the image data from the writing part 16. An electrostatic latent image is formed on the photoconductor 18 by being exposed to such laser light and a toner image is formed by being developed by a developing part 19. The transfer medium in a feeding tray 21 is conveyed to a pair of resist rollers 22 by a pair of feeding rollers 20. The feeding of the transfer medium by the resist rollers 22 is started at timing when the toner image on the photoconductor overlaps the transfer medium. A transfer charger 23 electrostatically transfers the toner image from the photoconductor 18 onto the transfer medium. The part of the transfer medium onto which part the toner image is transferred is separated from the photoconductor 18 by a separation charger 24. The toner image on the transfer medium is thermally fixed by a fixing part 25, after which the transfer medium is delivered to a delivery tray by a pair of delivery rollers 26.

The toner remaining on the photoconductor 18 after the electrostatic transfer is cleaned by a cleaner part 27. After cleansing, the photoconductor 18 is electrically discharged by an electric discharger 28. A plotter control part 29 processes detected data from various sensors and controls various drive motors for the driving photoconductor 18, the pair of feeding rollers 20, the pair of resist rollers 22, the fixing part 25, etc.

The system control unit 5 performs, through transmission, setting of various parameters, process execution indications, etc., for the reading unit 1, the storage unit 3, the image-forming unit 2, and the facsimile unit 6 in response to the operations performed by a user on the operational unit 4. The status of the overall device is displayed on the display of the operational unit 4. Accordingly, the system control unit 5 performs the overall control in response to the operations performed by the user on the operational unit 4.

The facsimile unit 6 performs, according to the indications from the system control unit 5, digital image data compression with respect to the image data provided from the IPU 14 or the storage unit 3 based on G3, G4 facsimile data transfer standards and transfers the compressed image data to the telephone line. On receiving data from the telephone line, the facsimile unit 6 restores the data and provides the restored data to the writing part 16 of the image-forming unit 2, etc., and the received data is made visible.

The selector unit 7 changes the connection status of its selector depending on the indications from the system control unit 5 and selects one from the reading unit 1, the storage unit 3, and the facsimile unit 6 as the output destination of the image data.

The storage unit 3 is generally used for duplication applications such as repeat copying, rotation copying, etc., by storing the image data of the manuscript provided from the IPU 14. The storage unit 3 may also be used as a buffer memory for temporarily storing the digital image data from the facsimile unit 6. The storage of the data is performed as indicated by the system control unit 5.

Figure 4:
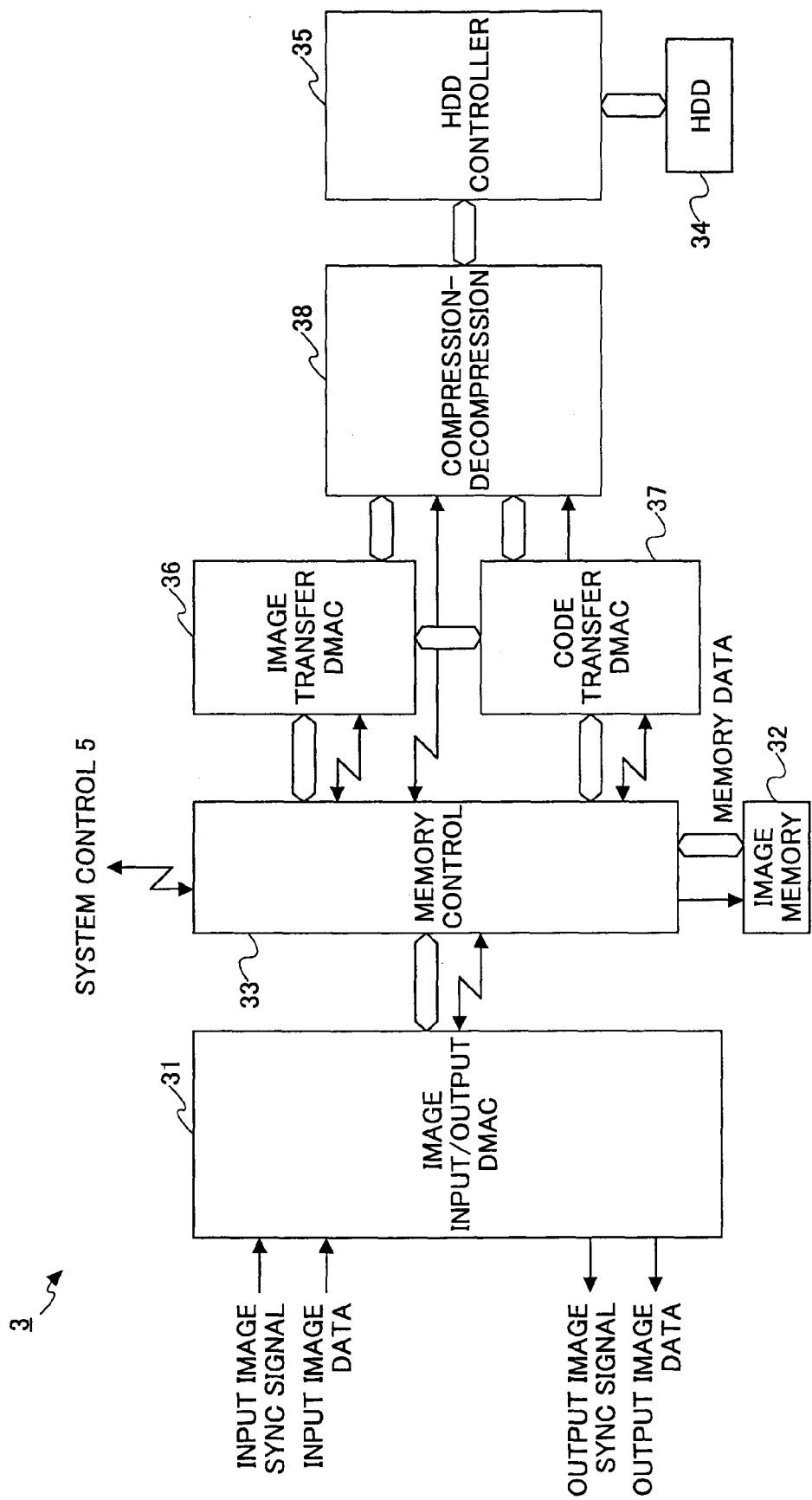
FIG. 4 is a schematic diagram of a storage unit.

FIG. 4 is a schematic diagram of the storage unit 3.

An image input/output direct memory access controller (DMAC) 31 consists of a central processing unit (CPU) and a logic circuit, and performs transmission with a memory control part 33 so as to receive commands. The image input/output DMAC 31 performs operation setting responsive to the commands. The memory control part 33 is provided with status information indicating the current status of the image input/output DMAC 31.

On receiving the image input command from the memory control part 33, the image input/output DMAC 31 packs the image data provided by way of the selector unit 7 into memory data in units of 8 pixels according to the image synchronization signal /FGATE, and provides it to the memory control part 33 as needed with the memory access signal. On receiving the image output command, the image input/output DMAC 31 provides the image data received from the memory control part 33 in phase with the image synchronization signal /FGATE.

An image memory 32 is where the image data is stored and consists of a semiconductor memory element such as DRAM, etc. The memory capacity of the image memory is, for example, 157.5 DPC (=4,000 DPI) corresponding to 8 megabytes (MB), which is the sum of 4 MB for A3 size and 4 MB for electronic sorting storage, both with respect to binary image data. The image memory 32 is accessed by the memory control part 33.

The memory control part 33 consists of a CPU and a logic circuit, performs transmission with the system control unit 5 so as to receive commands, performs operation setting responsive to the commands, and provides status information indicating the current status of the storage unit 3 to the system control unit 5.

The commands from the system control unit 5 include commands indicating image input, image output, compression, decompression, etc., and the image input commands and the image output commands are provided to the image input/output DMAC 31 and the commands related to compression are provided to an image transfer DMAC 36, a code transfer DMAC 37, and a compression-decompression part 38.

Figure 5:
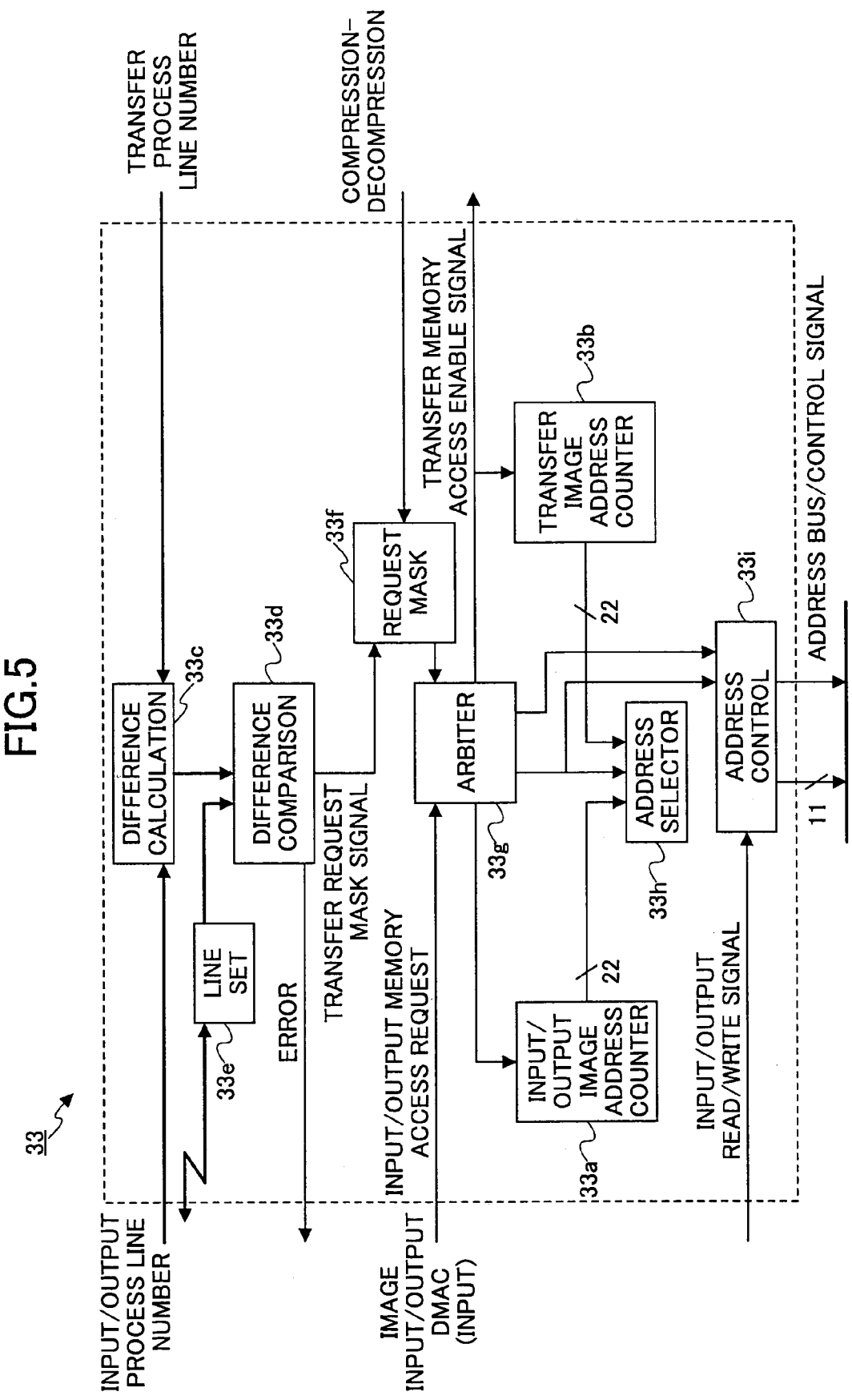
FIG. 5 is a schematic interior diagram of a memory control part in the storage unit.

FIG. 5 is a schematic interior diagram of the memory control part 33. The interior configuration and operation of each part is described below with reference to FIG. 5.

An input/output image address counter 33a counts up input/output memory access request signals provided from the image input/output DMAC 31, and provides memory address data of 22 bits indicating the storage location where the input/output image data is stored. At the beginning of memory access, the address is initialized once.

A transfer image address counter 33b counts up transfer memory access enable signals provided from an arbiter 33g, and provides memory address data of 22 bits indicating the storage location where the transfer image data is stored. At the beginning of memory access, the address is initialized once.

A difference calculation part 33c calculates, at the time of image data input, the difference between the input/output process line number provided from the image input/output DMAC 31 and the transfer process line number provided from the compression-decompression part 38. The obtained difference (difference line number) is provided to a difference comparison part 33d.

The difference comparison part 33d compares, at the time of image data input, the difference line number provided from the difference calculation part 33c and a set value provided from a line setting part 33e. When the difference line number is equal to the set value, then the difference comparison part 33d provides an inactive transfer request mask signal to a request mask 33f and when the difference line number is not equal to the set value, then the difference comparison part 33d provides an active transfer request mask signal to the request mask 33f. Other than the above or when input/output of image data is not being performed, the signal is made inactive.

The line setting part 33e sets, when the image memory part 32 is used as a buffer at the time of image data input, the set value to be used for the comparison in the difference comparison part 33d based on a setting request from the system control part 5. Any value can be set.

The request mask 33f masks (i.e. puts in a disenabled status) the transfer memory access request signal for allowing the compression-decompression part 38 to access an HDD 34 via an HDDC 35 (see FIG. 4) according to the transfer request mask signal from the difference comparison part 33d, and stops the data transfer process.

The arbiter 33g provides the transfer memory access enable signal indicating that the compression-decompression part 38 can access the HDD 34. Such a signal is provided based on the input/output memory access signal from the image input/output DMAC 31 and the transfer memory access request signal provided by way of the request mask 33*f*.

An address selector 33*h* selects one from the address data from the input/output image address counter 33*a* and the address data from the transfer image address counter 33*b* according to the arbiter 33*g*.

An access control circuit 33*i* distributes the address data provided by way of the address selector 33*h* into row addresses and column addresses, and provides it to an address bus of 11 bits. In addition, according to an access start signal from the arbiter 33*g*, the access control circuit 33*i* provides a control signal (RAS, CAS, WE) for the image memory 32.

In the above configuration of the image control part 33, the image input indication from the system control unit 5 initializes the memory control part 33 and puts the memory control part 33 in a waiting status for image data, and the image data can be stored in the storage unit 3 through operation of the reading unit 1. The image data provided to the storage unit 3 is temporarily written in the image memory 32. The number of process lines of the written image data is counted in the image input/output DMAC 31 and the counted number is transmitted to the memory control part 33 as the input/output process line number. The compression-decompression part 38 receives the image transfer command from the memory control part 33 and provides the transfer memory access request signal thereto; however, the transfer memory access request signal is masked by the request mask 33*f* of the memory control part 33 and thus access due to such a signal is not performed. When one line of the image data from the image input/output DMAC 31 is completed, the masking of the transfer memory access request signal is released; the reading out of the image data from the image memory 32 is performed; and the transfer operation of the compression-decompression part 38 is started. During such operation, the difference between the two process line numbers is calculated in the difference calculation part 33*d* and when the difference is equals to 0, the transfer memory access request signal is masked to ensure that there is no passing of address.

Now referring to FIG. 4 again, further details of the storage unit 3 are given below.

The image transfer DMAC 36 consists of a CPU and a logic circuit, performs transmission with the memory control part 33 so as to receive commands, performs operation setting responsive to the commands, and provides status information indicating the current status to the memory control part 33. On receiving a compression command, the image transfer DMAC 36 provides the memory access request signal to the memory control part 33 and receives the image data when the memory access enable signal is active, and the image data is transferred to the compression-decompression part 38. The image transfer DMAC 36 houses an address counter that counts up the memory access request signals. The image transfer DMAC 36 provides memory address data of 22 bits for reading out the image data or for indicating the storage location where the image data is stored, which memory address data is generated using the counted value.

The code transfer DMAC 37 consists of a CPU and a logic circuit, performs transmission with the memory control part 33 so as to receive commands, performs operation setting responsive to the commands, and provides status information indicating the current status to the memory control part 33. On receiving a decompression command, the code transfer DMAC 37 provides the memory access request signal to the memory control part 33 and receives the image data when the memory access enable signal provided from the memory control part 33 is active, and the image data is transferred to the compression-decompression part 38. The code transfer DMAC 37 houses an address counter that counts up the memory access request signals. The code transfer DMAC 37 provides memory address data of 22 bits for reading out the image data or for indicating the storage location where the image data is stored, which memory address data is generated using the counted value.

The compression-decompression part 38 consists of a CPU and a logic circuit, performs transmission with the memory control part 33 so as to receive commands, performs operation setting responsive to the commands, and provides status information indicating the current status to the memory control part 33. The compression-decompression part 38 compresses the binary image data with the MH coding method.

The HDD controller (HDDC) 35 consists of a CPU and a logic circuit, performs transmission with the memory control part 33 so as to receive commands, performs operation setting responsive to the commands, and provides status information indicating the current status to the memory control part 33. The HDDC 35 performs the reading out or accessing (data transfer) of the status information of the HDD 34. The HDD 34 is the secondary memory device.

The storage unit 3 with the above-mentioned configuration, at the time of image input and data storage, writes the image data in the storage region reserved in the image memory 32 by the image input/output DMAC 31, or reads out the image data stored in the storage region though the indication from the system control unit 5. At this time, the image input/output DMAC 31 counts the number of lines of the image data and provides the counted number as the input/output process line number to the memory control part 33.

Figure 6:
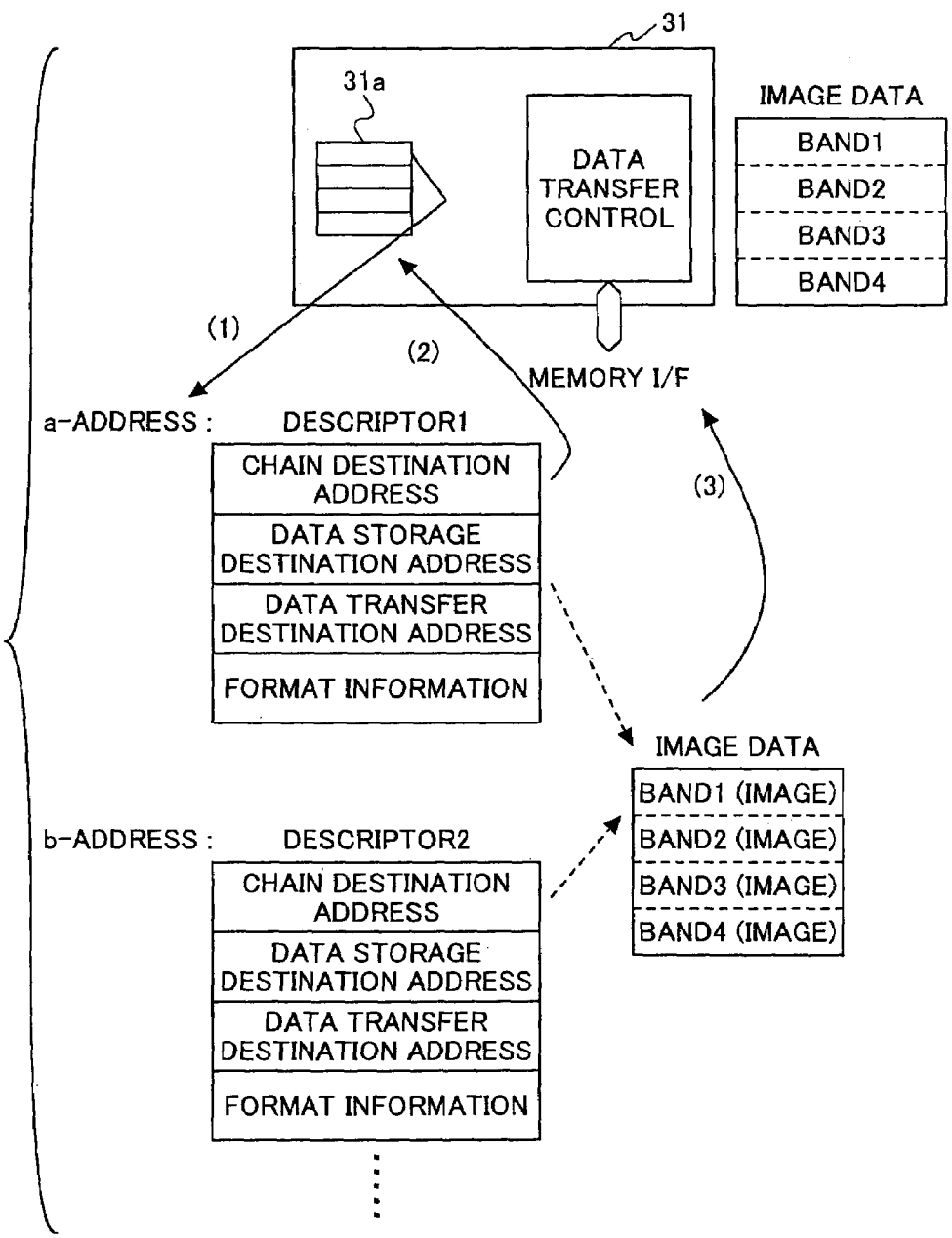
FIG. 6 is a diagram for illustrating an access operation (data transfer operation) by a descriptor of an image input/output direct-memory-access controller (DMAC)

FIG. 6 is a diagram for illustrating the accessing operation (data transfer operation) by the descriptor of the image input/out DMAC 31. In this example, the image data is divided into 4 bands and the data transfer is carried out with respect to such image data. It is noted that the operations in other DMACs such as DMAC 36 and DMAC 37 are the same as that of the DMAC 31.

First, the process of adding the total transfer line number (number of lines to be transferred) in a single image data is described.

When the image input/output DMAC 31 receives the transfer command from the memory control part 33, a descriptor storage register 31*a* inside the image input/output DMAC 31 is loaded with the contents of the descriptor 1 in the memory by accessing a chain destination address (a-address) set by the CPU. The loaded contents are constructed from 4 words including the chain destination address (head address) indicating the storage region of the next descriptor, a data transfer destination address indicating the head address of transferring data, a data transfer line number indicating the amount of data to be transferred in line numbers, and format information designating whether a CPU interrupt is to be generated when the data transfer of the set line number is completed. The least significant bit of the format information is provided for designating whether the CPU interrupt is to be generated when the data transfer of the set line number is completed. When the value of the bit is 0, the CPU interrupt is generated and when the value of the bit is 1, the CPU interrupt is not generated.

In the example shown in FIG. 6, the image data is divided into 4 bands and the value of the least significant bit of the format information of each descriptor is set to 0. Therefore, when the image transfer of each band is completed, a CPU interrupt is generated. Due to such CPU interrupts, it is possible to perform data transfer while detecting the transfer completion timing and the line numbers by adding the line numbers set to each descriptor.

When transferring the image data from the image memory 32 to the HDD 34 via the compression-decompression part 38 (i.e. when transferring the image data from the primary memory device to the secondary memory device), since the setting of the descriptor of the memory control part 33 is for data transfer of one band, the setting of the line number of the descriptor is set as the image line number. The descriptor storing such a line number and having the storage destination address indicating the code transfer DMAC 37 is provided to the image transfer DMAC 36. In the descriptor having the storage destination address indicating the code transfer DMAC 37, the data storage destination address is set to the HDDC 35. Accordingly, the image data transfer in the following path is realized. That is to say, image memory 32→memory control part 33→image transfer DMAC 36→code transfer DMAC 37→compression-decompression part 38→HDDC 35→HDD 34. After the completion of the data transfer, the HDDC 35 reports the capacity used when storing the data into the HDD 34. The storage address (for example, the head address) indicating where the image data is stored in the HDD 34 and the used capacity is stored in an HDD management region reserved in the image memory (the primary memory device) 32. During the data transfer, the memory control part 33 masks the transfer memory access request so that the image data transfer to the compression-decompression part 38 does not get ahead of the image data transfer from the image input/output DMAC 31 (i.e., the data transfer to the secondary memory device is controlled so as not to get ahead of the data transfer of the image input).

On the other hand, when transferring the image data from the HDD 34 to the image memory 32 via the compression-decompression part 38 (i.e. when transferring the data from the secondary memory device to the primary memory device), the storage address and the used capacity stored in the HDD management region reserved in the image memory 32 are obtained. The storage destination address is designated for the HDDC 35, the used capacity is designated for the code transfer DMAC 37, and the line number after decompression is designated for the image transfer DMAC 36. Then, the image transfer is performed in the following path. That is to say, HDD 34→HDDC 35→compression-decompression part 38→code transfer DMAC 37→image transfer DMAC 36→memory control part 33→image memory 32. When performing data transfer in paths other than the mentioned paths, the memory control part 33 provides the descriptor created in a similar way to any DMAC so as to realize the data transfer in the paths other than the mentioned paths.

Accordingly, the image memory 32 and the HDD 34 are shared for storage of the image data to be processed. According to the first embodiment of the present invention, conventional problems such that each of the reading unit 1, the image-forming unit 2, and the facsimile unit 6 cannot properly perform respective processes and the time needed for such processes becomes unacceptably long, which problems arise due to the decrease in the data transfer rate caused by such sharing, are prevented as described below.

The data transfer rate changes according to the system configuration and employed devices. In the first embodiment according to the present invention, the data transfer rate (rx_speed1) from the reading unit 1 (facsimile unit 6) to the image memory 32; the data transfer rate (rx_speed2) from the image memory 32 to the HDD 34, all above at the time of data input; the data transfer rate (tx_speed1) from the HDD 34 to the image memory 32; and the data transfer rate (tx_speed2) from the image memory 32 to the image-forming unit 2 (facsimile unit 6), etc. are previously stored on a nonvolatile memory (not shown) comprised in the system control unit 5, as inherent characteristic values.

An expected transfer completion time (expect_time), which is the time when the data transfer is expected to be completed, is calculated by taking the amount of data (data1); the path of the data transfer; and the data transfer rate determined from the path into consideration.

For example, when the image data provided from the reading unit 1 is to be stored on the HDD 34, the expected transfer completion time is calculated as follows:

$$\text{expect\_time}=\text{data1}/\text{rx\_speed1}+\text{data1}/\text{rx\_speed2}+\text{wait\_time}$$

For example, when the image stored on the HDD 34 is to be provided to the image-forming unit 2, the expected transfer completion time is calculated as follows:

$$\text{expect\_time}=\text{data1}/\text{tx\_speed1}+\text{data1}/\text{tx\_speed2}+\text{wait\_time}$$

wherein, wait_time is the waiting time actually needed for processes other than the data transfer. The waiting time varies depending on the current operational status as shown below.

$$\text{wait\_time}=\text{WAIT\_DRAM}+\text{WAIT\_HDD}+\alpha$$

wherein, WAIT_DRAM is the time necessary until the image memory 32 becomes available for the relevant request by being released from other requests, which are in advance occupying the image memory 32. WAIT_DRAM is calculated taking remaining time of the expected transfer completion time of the current transfer request; the presence of other transfer requests, which are currently waiting; and the expected transfer completion time of other transfer requests, if such requests are present, into consideration. WAIT-HDD is the time necessary until the HDD 34 becomes available for the relevant request by being released from other transfer requests, which are in advance occupying the HDD 34. WAIT_HDD is calculated in a similar way as WAIT_DRAM. $\alpha$ is the time needed for overhead other than mentioned above, and the worst value (the longest value) is used as a fixed value.

The waiting time (wait_time) is obtained, for example, by the memory control part 33 calculating WAIT_DRAM and WAIT-HDD, and is then reported to the system control unit 5. Then the system control unit 5 calculates the expected transfer completion time (expect_time) using the waiting time reported by the memory control part 33. The amount of data (data1) necessary for calculating the waiting time is obtained from the request origin, which requested the data transfer.

The system control unit 5 designates, at the time of data transfer request, a transfer completion time (complete_time), which is the time when the data transfer is to be completed, according to need. The transfer completion time is calculated based on the amount of data and the lowest data transfer rate needed at the data transfer designation or the data transfer origin. By comparing the transfer completion time (complete_time) and the expected transfer completion time (expect_time), it is determined whether the actual data transfer completes within the transfer completion time.

When the data transfer is performed in the time-multiplexed process, the expected transfer completion times of other transfer requests may change by performing the requested data transfer. Accordingly, when it is determined that the data transfer completes within the transfer completion time, the expected transfer completion time when an additional data transfer is requested is calculated. The system control unit 5 accepts new transfer requests only when it is determined that there is no transfer request that cannot complete its data transfer within the transfer completion time. This determination is performed every time when there is a new transfer request and the system control unit 5 accepts those transfer requests when it is determined that all the data transfer of those transfer requests will complete within the transfer completion time. The accepted transfer requests are managed in queues as shown in FIG. 7. When the transfer request is not accepted, then such rejection is reported to the origin of the transfer request.

Accordingly, when such a new transfer request is accepted, each of the reading unit 1, the image-forming unit 2, and the facsimile unit 3, which transfers the data or where the data is transferred to, can always optimally perform respective processes without substantially reducing the processing rate. Therefore, high productivity of the data processing device such as an image-forming device can always be maintained.

As shown in FIG. 7, in the waiting queues, identification for identifying the transfer request, the origin of the transfer request, the current status, the amount of data to be transferred, the transfer completion time, etc., are registered in the order in which the transfer requests are accepted. Accordingly, the transfer requests are processed sequentially in the accepted order. In the waiting queues, the transfer completion time is represented as the time of the day. Every time when the current status of the transfer request changes, such as a start or completion of a data transfer, such a change in the current status is reported to the origin or the transfer request with the identification.

The processing order, which is the order in which the transfer requests are accepted, registered in the waiting queue can be re-ordered at will. Further, the execution of one of the transfer requests can be abandoned by removing such a transfer request from the waiting queue. Such removal is reported to the origin of the transfer request with the identification. According to the first embodiment of the present invention, a plurality of waiting queues are provided, for example, a waiting queue for the input (data transfer to the storage unit 3) and a waiting queue for the output, in order to realize a plurality of input/output data transfers simultaneously.

It is noted that according to the first embodiment of the present invention, the new transfer requests are accepted only when it is determined that all the data transfer of the transfer requests will complete within the transfer completion time. However, it is also possible to determine a timing to start the data transfer on the condition that all the data transfer can be completed within the transfer completion time, and such timing may be accepted. Alternatively, level of importance may be taken into consideration when accepting transfer requests. That is to say, those transfer requests that can be cancelled may be eliminated from the waiting queue and those transfer requests that can be postponed may be processed later.

Although according to the first embodiment of the present invention, each of the reading unit 1, the image-forming unit 2, and the facsimile unit 3 corresponds to the data processing means, the number and the types of the data processing means are not limited thereto. The present invention is applicable to the data processing device implemented with a plurality of various data processing means.

Programs that realize the operation of the data processing device (image-forming device) and the variations thereof may be stored on a medium such as a CD-ROM, DVD, or an optical disk and may be distributed. Alternatively, all or a part of such programs may be distributed through a transmission medium used in a public network, etc. A user may obtain and load such programs onto the existing data processing device in order to apply the present invention to such a device. In this sense, the recording medium may be such that the device distributing the programs can access the medium.

A second embodiment of the present invention is described hereinafter. The configuration and the operation of each part constituting the second embodiment according to the present invention is the same as that of the first embodiment according to the present invention. Therefore, the descriptions of FIG. 1 through FIG. 6 are omitted.

In the second embodiment of the present invention, in addition to the configuration mentioned in FIG. 1 through FIG. 6, there are provided priority designation means for designating priority of the image signal input/output operation; input/output operation request acceptance means for accepting a plurality of image signal input/output operation requests; processing order control means for determining the processing order of the image signal input/output operation requests based on the respective priorities; interruption determination means for determining whether the current image signal input/output operation is interruptible; and interruption/resumption control means for interrupting/resuming the current image signal input/output operation based on the priority of the image signal input/output operation and the determination result from the interruption determination means. These means are provided in the system control part 5.

Figure 8:
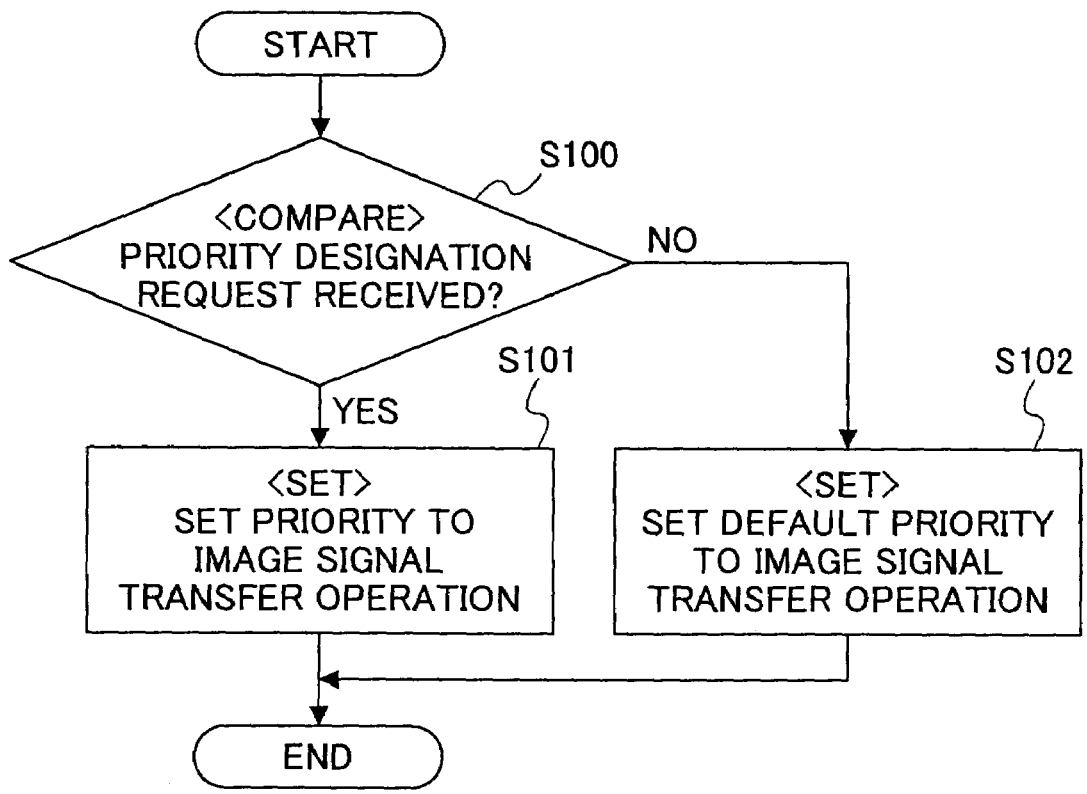
FIG. 8 is a flow chart illustrating processing operation of priority designation means.

The priority designation means designates priority of the image signal transfer operation when the execution of the image signal input/output operation is requested. The processing operation of the priority designation means is described with reference to FIG. 8.

On receiving the execution request of image signal input/output operation, the priority designation means receives a priority designation request from the operational unit 4 shown in FIG. 1 (S100). Then, the priority designated from the operational unit 4 is set for the image signal input/output when its execution is requested (S101). When the priority designation means does not receive the priority designation request from the operational unit 4, the priority of the image signal input/output operation is set to a default value (S102).

The priority designation means enables designating priority when executing the image signal input/output operation is requested and thus an order of priority can be determined.

A series of processing operations of the processing order control means and interruption/resumption control means is described with reference to FIG. 9.

On receiving the plurality of execution requests for image signal input/output operation (S110), the execution request with the highest priority is searched for in the execution requests (S111). Then, it is determined whether the current operation is interruptible or not (S112). When it is determined that the operation of the current image signal input/output operation request is interruptible, the priority of the current image signal input/output operation request and the priority of the received image signal input/output operation execution request are compared (S113). When the priority of the received image signal input/output operation execution request is higher than the priority of the current operation, the current operation is interrupted (S114), the received image signal input/output operation is executed (S115), and the interrupted operation is resumed when the received image signal input/output operation is completed (S116). When the current operation cannot be interrupted or when the priority of the current operation is higher than the operation of the received operation, the current operation is continued.

Figure 10:
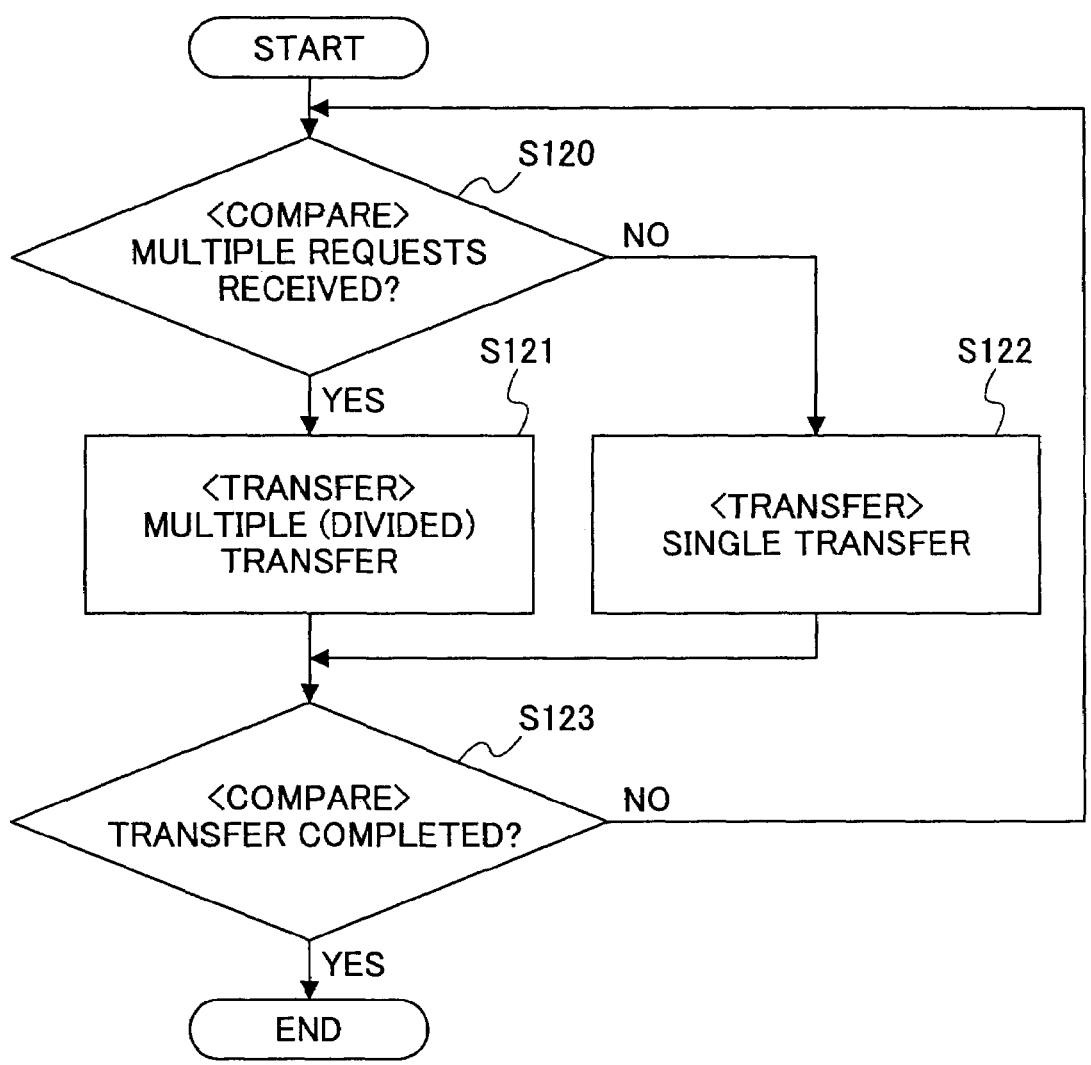
FIG. 10 is a flow chart illustrating processing operation of input/output operation request acceptance means accepting a plurality of image signal input/output operation requests.

The processing operation of the input/output operation request acceptance means for accepting the plurality of image signal input/output operation requests is described with reference to FIG. 10.

It is determined whether a plurality of the received image signal input/output operation requests are received or not (S120). When a plurality of requests are received, the data transfer from the primary memory device to the secondary memory device is performed in several transfers (S121). When a plurality of requests are not received, i.e. only one request is received, the data transfer from the primary memory device to the secondary memory device is performed all at once (S122). The reception of the plurality of operation requests is continually checked until the data transfer is completed (S123). Accordingly, divided data transfer enables receiving the plurality of operation requests.

By providing means for obtaining a primary memory region for storing image data, and means for obtaining a secondary memory region, in which image data is compressed (converted) by the compression-decompression part 38, it is possible to obtain any capacity or fixed capacity for the respective regions. Further, in order to realize the divided data transfer, the series of processes including obtaining the fixed capacity of the primary memory region; converting the image data corresponding to the fixed capacity; and transferring the converted image data to the secondary memory region is repeatedly performed.

Figure 11:
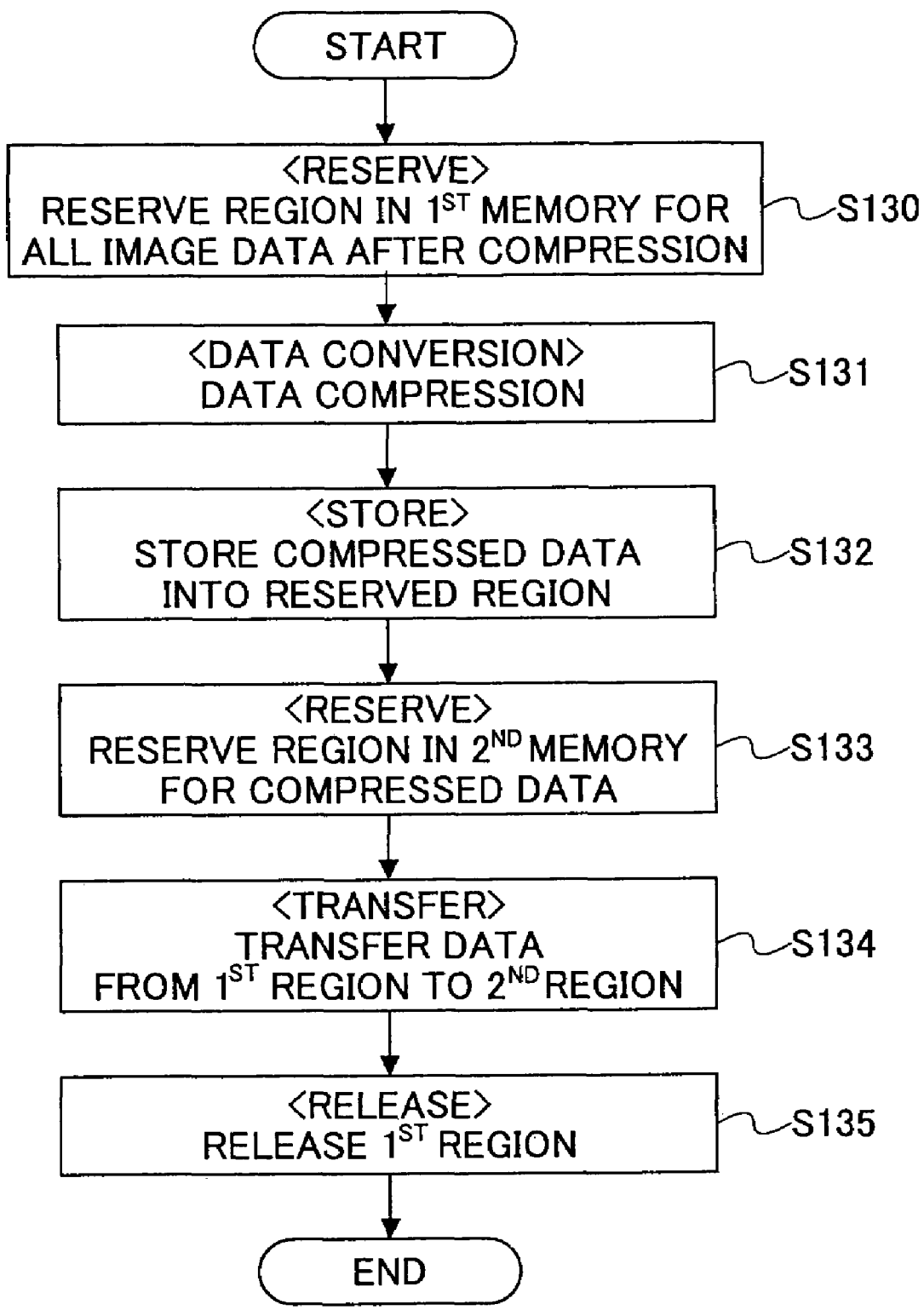
FIG. 11 is a flow chart illustrating a processing operation of transferring of data in a primary memory region to a secondary memory region in a single transfer.

The processing operation wherein the data in the primary memory region is transferred to the secondary memory region in a single transfer is described with reference to FIG. 11.

First, a region that can hold all the amount of the image data stored in the primary memory device (image memory 32), after such image data is compressed, is reserved in the primary memory device (S130). Then, the image data is compressed using the compression-decompression part 38 (S131). The compressed image data is stored in the region reserved in the primary memory device in S130 (S132). After storage, a region for holding the amount of the compressed image data is reserved in the secondary memory device (HDD 34) (S133). Then, the image data in the primary memory region is transferred to the secondary memory region (S134). After the completion of the transfer, the region reserved in the primary memory device is released (S135).

Figure 12:
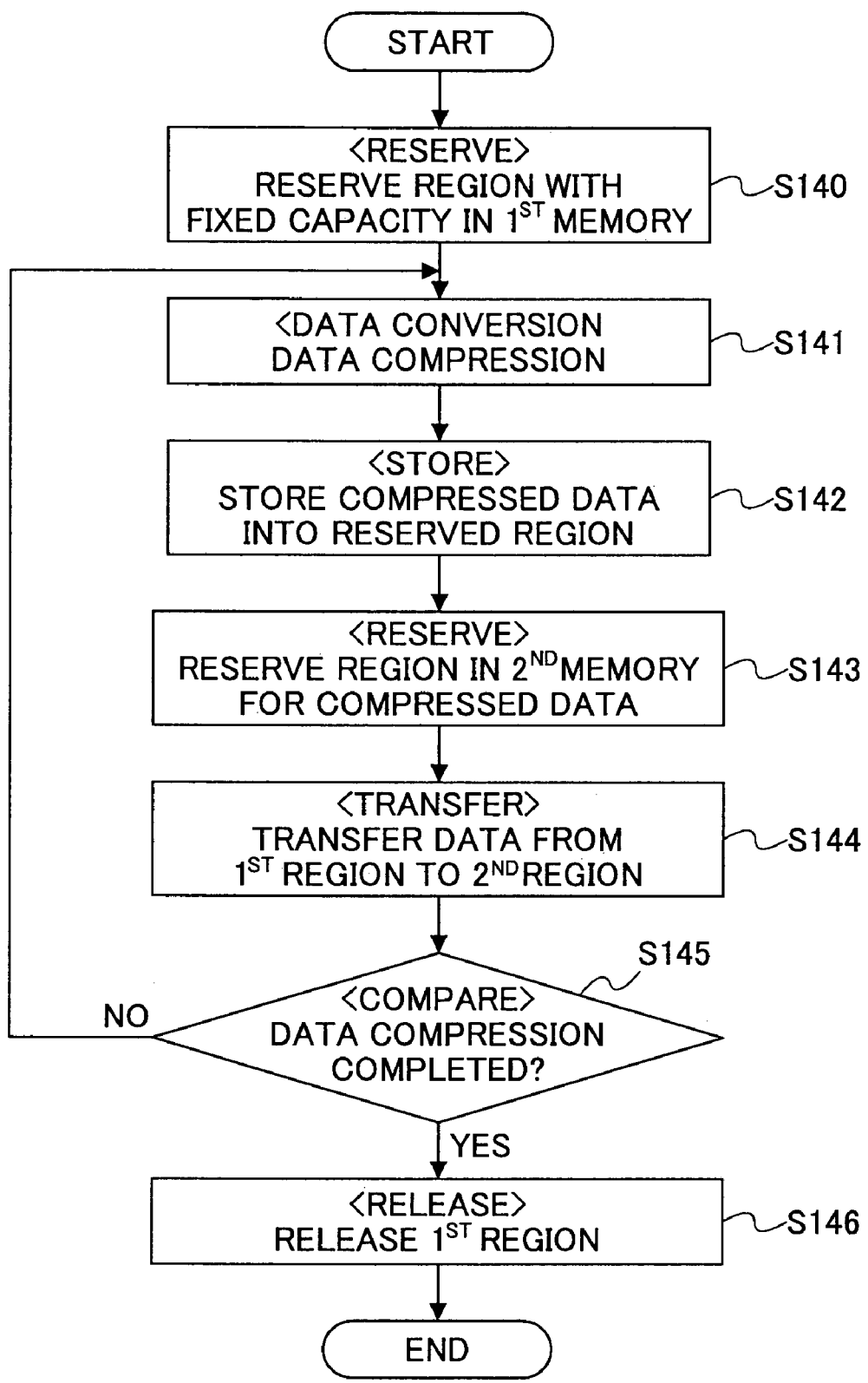
FIG. 12 is a flow chart illustrating a processing operation of transferring of the data in the primary memory region to the secondary memory region in multiple transfers.

The processing operation wherein the data in the primary memory region is transferred to the secondary memory region in multiple transfers is described with reference to FIG. 12.

First, a region with fixed capacity for holding the image data after compression is reserved in the primary memory device (S140). Since this region has fixed capacity, there is no relation with respect to the amount of the image data after compression. Then, the image data is compressed using the compression-decompression part 38 (S141). The compressed image data is stored in the region reserved in the primary memory in S140 (S142). At this time, all of the compressed image data may not be stored in the reserved region of fixed capacity. Therefore, depending on a completion response of the compression-decompression part 38, it may be necessary to vary the processing operation. A region corresponding to the used capacity of the primary memory region with fixed capacity is reserved in the secondary memory device (S143). Then, the image data in the first memory region is transferred to the secondary memory region (S144). After the completion of the transfer, it is determined whether the compression of all image data is completed or not (S145). When it is determined that the compression of all image data is not completed, the processing operation returns to S141 to continue with the compression. The newly compressed image data is overwritten onto the region with fixed capacity in the primary memory device, the previous image data stored in the primary memory region having already completed the transfer. When compression of all image data is completed, the region with fixed capacity in the primary memory device is released (S146).

The data transfer capability can be estimated from the data transfer rate to the secondary memory device. By selecting the amount of data conversion and the storage capacity based on the data transfer capability, it is possible to efficiently select the utilization rate of the primary memory region and the secondary memory region in the respective memory devices.

As described above, in the second embodiment according to the present invention, it is possible to reduce the processing time needed for operation requests with higher priority when a plurality of image signal input/output operation requests are received by determining the processing order according to the priority designated at the time of input/output operation request; determining whether the current operation is interruptible; and controlling interruption/resumption when the current operation is interruptible.

Figure 13:
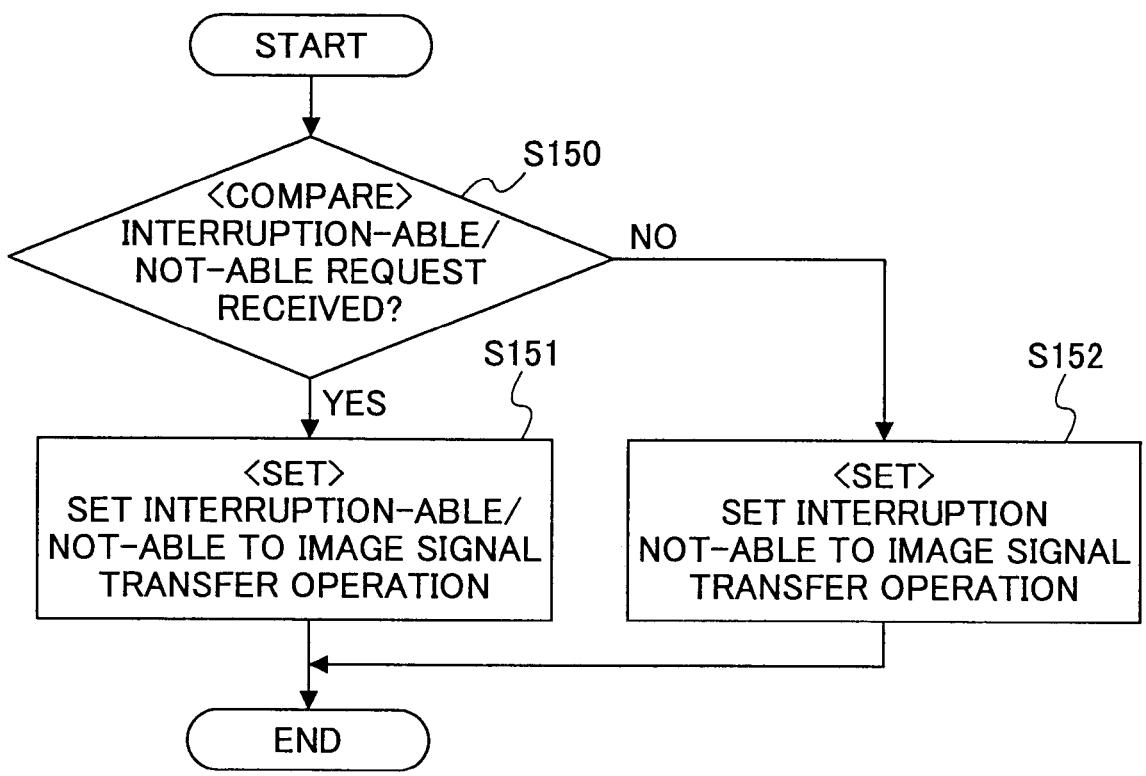
FIG. 13 is a flow chart illustrating a processing operation of interruption designation means.

In addition, in the second embodiment according to the present invention, the determination of whether the current operation is interruptible can be made from the transfer time, processing time, etc., of each image signal input/output operation. However, interruption designation means may be provided for designating whether the image signal input/output operation is interruptible at the time of execution request of such image signal input/output operation, and the determination of whether the current operation is interruptible may be based on the designation information from the interruption designation means. The processing operation of the interruption designation means is shown in FIG. 13.

On receiving the execution request for the image signal input/output operation, the interruption designation means accepts designation of interruptibility or non-interruptibility for the received image signal input/output transfer operation from the operational unit 4 (S150). Then, the setting of interruptibility or non-interruptibility is performed (S151). When there is no designation input from the operational unit 4, then the image signal input/output operation is set as non-interruptible (S152). Accordingly, it is possible to designate that the current operation is interruptible or non-interruptible.

Figure 9:
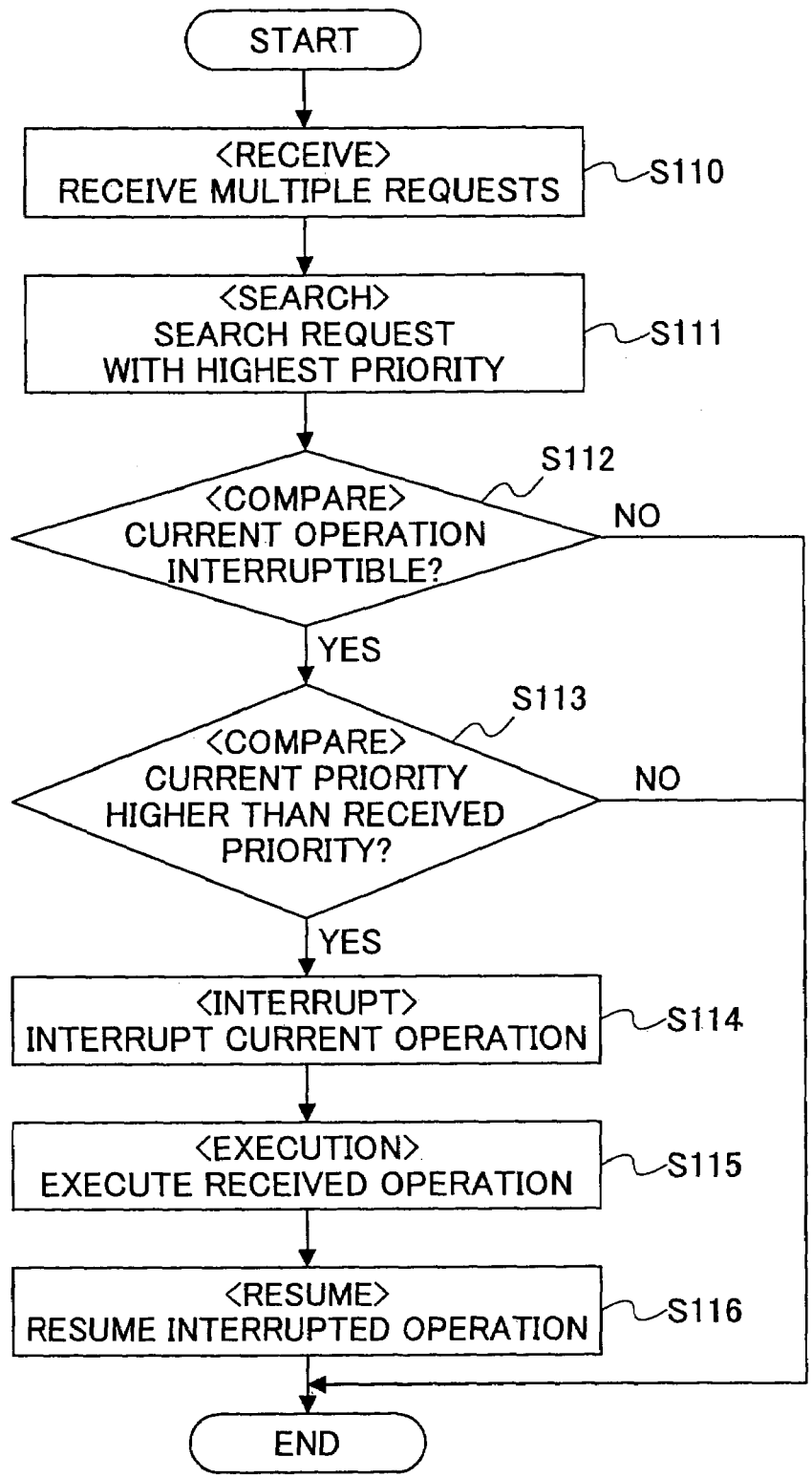
FIG. 9 is a flow chart illustrating processing operation of processing order control means and interruption/resumption control means.
Figure 14:
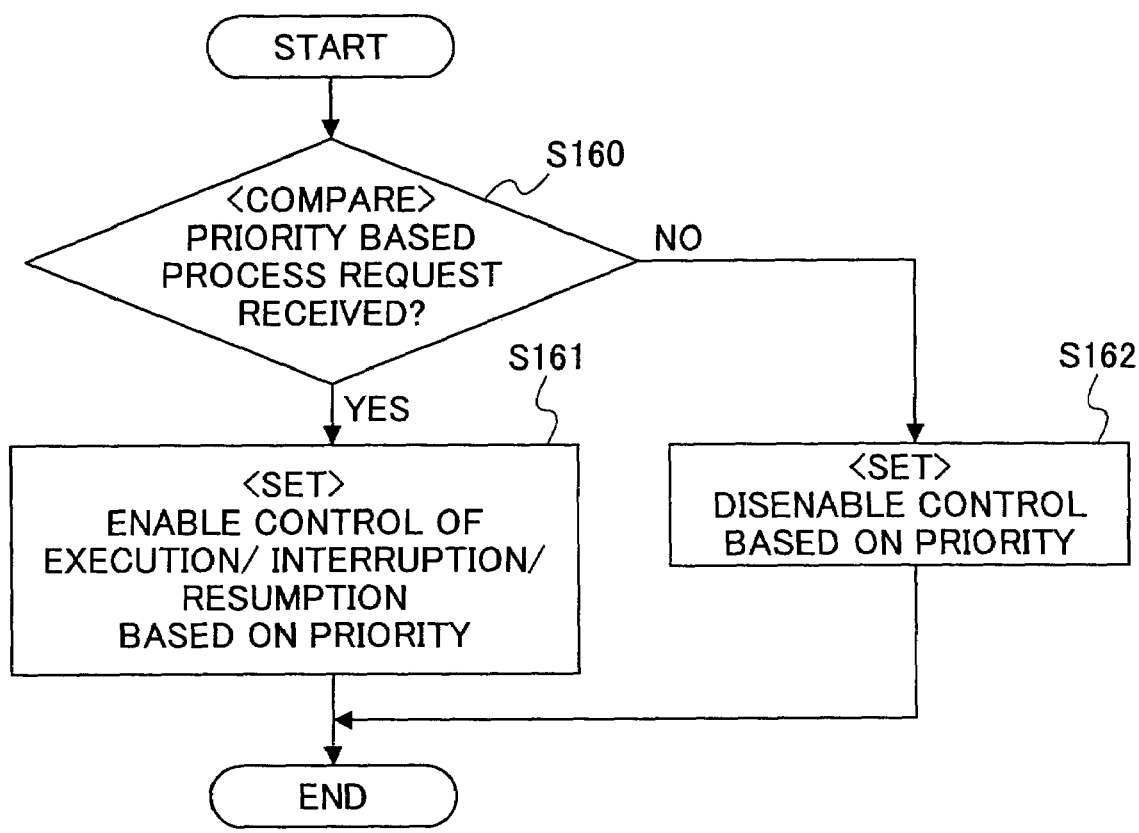
FIG. 14 is a flow chart illustrating a processing operation of priority based processing selection means.

Further, it is possible to provide priority-based-processing selection means for selecting whether to perform the processing operation based on the priority such as shown in FIG. 9. The processing operation of the priority-based-processing selection means is described with reference to FIG. 14.

On receiving the execution request of image signal input/output operation, the priority-processing-selection means accepts a priority-based-processing request from the operational unit 4 (S160). On receiving such a request for performing control based on priority from the operational unit 4, the control of execution/interruption/resumption of the image signal input/output operation based on the priority is enabled (S161). When the priority-based-processing request is not received, then the control based on the priority is disenabled (S162).

Accordingly, by enabling the switching of the control based on the priority by providing such priority-based-processing selection means, it is possible to perform operations according to need.

It is to be noted that the first embodiment of the present invention and the second embodiment of the present invention may be combined. To state it differently, the first embodiment of the present invention in general relates to the management of accesses and thus to the management of data transfer processes in response to such accesses made by the data processing units (the image input unit/image output unit) to the memory. The data transfer processes that cannot be completed within the data transfer completion time, which data transfer processes are usually requested at a later time than others, are either prevented or postponed. Accordingly, in the first embodiment of the present invention, when a plurality of data transfer processes are to be executed simultaneously, at least some of the data transfer processes are unable to meet the time constraint (i.e. to complete the data transfer process within the data transfer completion time), therefore such transfer processes are may be disenabled. Therefore, the productivity of the device is improved by obviating generation of data transfer processes that cannot be completed within the data transfer completion time. The second embodiment of the present invention in general relates to how to select among the data transfer 1C processes in response to the accesses made by the data processing units to the memory so as to efficiently execute a plurality of operations. Here, the data transfer processes may include those data transfer processes that are to be prevented or postponed in the first embodiment of the present invention. The efficiency of the device can be further improved by giving priorities to the data transfer processes so that the data transfer processes with a higher priority can be executed first and the data transfer processes with a lower priority are prevented or postponed as appropriate.

Further, the present invention is not limited to these embodiments, and variations and modifications may be made without departing from the scope of the present invention.

The present application is based on Japanese priority application Nos. 2002-272402 filed on Sep. 19, 2002, and 2002-274138 filed on Sep. 19, 2002, the entire contents of which are hereby incorporated by reference.

What claimed is:

1. A data processing device, comprising:
    a plurality of data processing units;
    a first memory shared for storing data, wherein each of said data processing units makes an access to said first memory so as to perform an operation;
    a transfer completion time designation unit configured to designate a transfer completion time according to need, wherein transfer of data in response to the accesses made by said data processing units should be completed within the designated transfer completion time;
    an expected transfer completion time calculation unit configured to calculate an expected transfer completion time needed for completing the data transfer in response to the accesses made by said data processing units, said expected transfer completion time calculation unit configured to calculate the expected transfer completion time based on a current access status of said first memory; and
    an access management unit configured to manage the access to said first memory based on the designated transfer completion time and the expected transfer completion time.

2. The device as claimed in claim 1, further comprising:
    a second memory configured to store the data stored in said first memory, said second memory having a transfer rate lower than a transfer rate of said first memory; wherein,
    when a data transfer is executed between said first memory and said second memory, said expected transfer completion time calculation unit is configured to calculate the expected transfer completion time based on the data transfer rates of said first memory and said second memory.

3. The device as claimed in claim 1, wherein:
    when one of the data processing units makes an additional access to said first memory, said access management unit is configured to prevent or postpone the additional access to said first memory when the expected transfer completion time exceeds the designated transfer completion time.

4. The device as claimed in claim 1, wherein:
    said data processing device is an image-forming device provided with, as one of the data processing units, an image input unit for inputting image data to said first memory, and as another of the data processing units, an image output unit for outputting the image data stored in said first memory.

5. A data processing device, comprising:
    a plurality of data processing means;
    first memory means shared for storing data, wherein each of said data processing means makes an access to said first memory means so as to perform an operation;
    transfer completion time designation means for designating a transfer completion time according to need, wherein transfer of data in response to the accesses made by said data processing means should be completed within the designated transfer completion time;
    expected transfer completion time calculation means for calculating an expected transfer completion time needed for completing the data transfer in response to the accesses made by said data processing means, said expected transfer completion time calculation means calculating the expected transfer completion time based on a current access status of said first memory means; and
    access management means for managing the access to said first memory means based on the designated transfer completion time and the expected transfer completion time.

6. The device as claimed in claim 5, further comprising:
    second memory means for storing the data stored in said first memory means, said second memory means having a transfer rate lower than a transfer rate of said first memory means; wherein,
    when a data transfer is executed between said first memory means and said second memory means, said expected transfer completion time calculation means calculates the expected transfer completion time based on the data transfer rates of said first memory means and said second memory means.

7. The device as claimed in claim 5, wherein:
when one of the data processing means makes an additional access to said first memory means, said access management means prevents or postpones the additional access to said first memory means when the expected transfer completion time exceeds the designated transfer completion time.

8. The device as claimed in claim 5, wherein:
said data processing device is an image-forming device provided with, as one of the data processing means, an image input means for inputting image data to said first memory means, and as another of the data processing means, an image output means for outputting the image data stored in said first memory means.

9. A computer-readable recording medium storing a program for executing on a computer, the program causing the computer to perform the steps of:
designating a transfer completion time according to need, wherein transfer of data in response to the accesses made to a first memory for storing data by a plurality of data processing units should be completed within the designated transfer completion time;
calculating an expected transfer completion time needed for completing the data transfer in response to the accesses made by said data processing units, based on a current access status of said first memory; and
managing the access to said first memory based on the transfer completion time and the expected transfer completion time.

10. An image-forming device, comprising:
an image input unit;
an image output unit;
a storage unit configured to store an image signal provided from said image input unit in a primary storage part, and to store the image signal stored in the primary storage part in a secondary storage part;
a delivering unit configured to deliver the image signal stored in the primary storage part, which image signal is read out from the secondary storage part, to said image output unit; and
a priority designation unit configured to allow a user to designate a priority for each of a plurality of image signal input/output operation requests.

11. The image-forming device as claimed in claim 10, further comprising:
a request acceptance unit configured to accept the image signal input/output operation requests;
a processing order control unit configured to determine a processing order of the image signal input/output operation requests based on respective priorities designated by said priority designation unit; and
an interruption/resumption control unit configured to interrupt a current image signal input/output operation request when the priority of the current image signal input/output operation request is lower than a highest priority of an image signal input/output operation request among the image signal input/output operation requests, and for resuming the current image signal input/output operation request after completion of the image signal input/output operation request with the highest priority.

12. The image-forming device as claimed in claim 11, said device further comprising:

a selection unit for selectively executing the control of said processing order control unit and said interruption/resumption control unit.

13. An image-forming device comprising:
image input means;
image output means;
storage means for storing an image signal provided from said image input means in a primary storage part, and storing the image signal stored in the primary storage part in a secondary storage part;
delivering means for delivering the image signal stored in the primary storage part, which image signal is read out from the secondary storage part, to said image output means; and
priority designation means for allowing the user to designate a priority for each of a plurality of image signal input/output operation requests.

14. The image-forming device as claimed in claim 13, said device further comprising:
request acceptance means for accepting the image signal input/output operation requests;
processing order control means for determining a processing order of the image signal input/output operation requests based on respective priorities designated by said priority designation means; and
interruption/resumption control means for interrupting a current image signal input/output operation request when the priority of the current image signal input/output operation request is lower than a highest priority of an image signal input/output operation request among the image signal input/output operation requests, and for resuming the current image signal input/output operation request after completion of the image signal input/output operation request with the highest priority.

15. The image-forming device as claimed in claim 14, said device further comprising:
selection means for selectively executing the control of said processing order control means and said interruption/resumption control means.

16. A data processing device, comprising:
a plurality of data processing units;
a first memory shared for storing data, wherein each of said data processing units makes an access to said first memory so as to perform an operation;
a transfer completion time designation unit configured to designate a transfer completion time according to need, wherein transfer of data in response to the accesses made by said data processing units should be completed within the designated transfer completion time;
an expected transfer completion time calculation unit configured to calculate an expected transfer completion time needed for completing the data transfer in response to the accesses made by said data processing units, said expected transfer completion time calculation unit configured to calculate the expected transfer completion time based on a current access status of said first memory;
an access management unit configured to manage the access to said first memory based on the designated transfer completion time and the expected transfer completion time; and
a priority designation unit configured to allow a user to designate a priority for each of the accesses made by said data processing units.

17. A data processing device, comprising:
a plurality of data processing means;

first memory means shared for storing data, wherein each of said data processing means makes an access to said first memory so as to perform an operation;

transfer completion time designation means for designating a transfer completion time according to need, wherein transfer of data in response to the accesses made by said data processing means should be completed within the designated transfer completion time;

expected transfer completion time calculation means for calculating an expected transfer completion time needed for completing the data transfer in response to the accesses made by said data processing means, said expected transfer completion time calculation means calculating the expected transfer completion time based on a current access status of said first memory means;

access management means for managing the access to said first memory means based on the designated transfer completion time and the expected transfer completion time; and priority designation means for allowing a user to designate a priority for each of the accesses made by said data processing means.

18. A data processing device, comprising:

a unit configured to receive a plurality of data transfer process requests;

a unit configured to calculate a required process time necessary for executing all data transfer processes corresponding to the data transfer process requests in a time-sharing process manner, when at least one data transfer process has a time constraint; and a unit configured to execute in the time-sharing process manner all data transfer processes except for data transfer processes that should be excluded from those data transfer processes to be executed for the purpose of satisfying the time constraint, when the calculated required process time exceeds the time constraint for a relevant at least one data transfer process.

19. The data processing device as claimed in claim 18, wherein:

said unit configured to execute in the time-sharing process manner all data transfer processes except for data transfer processes that should be excluded from those data transfer processes to be executed for the purpose of satisfying the time constraint is configured to select the data transfer processes to be excluded from those data transfer processes to be executed for the purpose of satisfying the time constraint, based on predetermined priority information provided to respective data transfer processes.

20. The data processing device as claimed in claim 19, wherein:

the data transfer processes that should be excluded comprise those data transfer processes having a lower priority in said predetermined priority information.

21. A data processing device, comprising:

means for receiving a plurality of data transfer process requests;

means for calculating a required process time necessary for executing all data transfer processes corresponding to the data transfer process requests in a time-sharing process manner, when at least one data transfer process has a time constraint; and means for executing in the time-sharing process manner all data transfer processes except for data transfer processes that should be excluded from those data transfer processes to be executed for the purpose of satisfying the time constraint, when the calculated required process time exceeds the time constraint for a relevant at least one data transfer process.

22. The data processing device as claimed in claim 21, wherein:

said means for executing in the time-sharing process manner all data transfer processes except for data transfer processes that should be excluded from those data transfer processes to be executed for the purpose of satisfying the time constraint selects the data transfer processes to be excluded from those data transfer processes to be executed for the purpose of satisfying the time constraint based on predetermined priority information provided to respective data transfer processes.

23. The data processing device as claimed in claim 22, wherein:

the data transfer processes that should be excluded comprise those data transfer processes having a lower priority in said predetermined priority information.

* * * * *